United States Patent [19]

Ohzawa et al.

[11] Patent Number: 5,038,235
[45] Date of Patent: Aug. 6, 1991

[54] SUPERPOSED TAPE CASSETTE STORAGE RACKS WITH PUSHER UNIT FACILITATING TAPE WITHDRAWAL

[75] Inventors: Shogo Ohzawa, Neyagawa; Teruhisa Yokota, Katano; Michitoshi Morimoto, Nara, all of Japan

[73] Assignee: Matsushita Electric Industrial Co., Ltd., Osaka, Japan

[21] Appl. No.: 366,133

[22] Filed: Jun. 14, 1989

[30] Foreign Application Priority Data

Jun. 17, 1988 [JP] Japan ................................. 63-150707

[51] Int. Cl.⁵ .................... G11B 23/023; G11B 15/68; B65D 85/672
[52] U.S. Cl. ........................................ 360/92; 360/94; 360/137; 360/96.5; 206/387; 206/444
[58] Field of Search ..................... 360/92, 94, 132, 60, 360/137, 96.5-96.6; 206/444, 387

[56] References Cited

U.S. PATENT DOCUMENTS

| 3,726,529 | 4/1973 | Ban | 360/92 |
|---|---|---|---|
| 3,733,078 | 5/1973 | Staar | 360/97 |
| 3,752,551 | 8/1973 | Dark | 360/92 |
| 3,812,537 | 5/1974 | Grae et al. | 360/92 |
| 4,235,490 | 11/1980 | Schwartz et al. | 312/15 X |
| 4,345,283 | 8/1982 | Maryschka | 360/137 |
| 4,493,417 | 1/1985 | Ackeret | 360/133 |
| 4,778,228 | 10/1988 | Ackeret | 360/132 |
| 4,803,575 | 2/1989 | Nishimura et al. | 360/94 |

FOREIGN PATENT DOCUMENTS

| 0247876 | 12/1987 | European Pat. Off. | 360/92 |
|---|---|---|---|
| 0253102 | 1/1988 | European Pat. Off. . | |
| 0287314 | 10/1988 | European Pat. Off. . | |
| 0288165 | 10/1988 | European Pat. Off. . | |
| 56-117359 | 9/1981 | Japan | 360/132 |
| 63-122077 | 5/1988 | Japan | 206/387 |
| 63-241754 | 10/1988 | Japan | 360/92 |
| 1169796 | 7/1989 | Japan | 206/387 |
| WO88/07344 | 10/1988 | PCT Int'l Appl. . | |
| 0582935 | 12/1976 | Switzerland | 360/92 |
| 2021072 | 11/1979 | United Kingdom . | |
| 2099290 | 12/1982 | United Kingdom . | |

Primary Examiner—Aristotelis M. Psitos
Assistant Examiner—Alfonso Garcia
Attorney, Agent, or Firm—Wenderoth, Lind & Ponack

[57] ABSTRACT

A tape cassette storage rack can accommodate tape cassettes of different sizes at a predetermined position. The accommodated tape cassette may be directly manually withdrawn from the rack without using a jig or the like. The tape storage racks create a high area efficiency available for the storing of the tape cassettes.

6 Claims, 10 Drawing Sheets

SUPERPOSED TAPE CASSETTE STORAGE RACKS WITH PUSHER UNIT FACILITATING TAPE WITHDRAWAL

BACKGROUND OF THE INVENTION

The present invention generally relates to a storing unit, and more particularly, to a tape cassette storage rack for use, for example, in a video tape recorder (VTR) automatic tape feeding apparatus which is arranged to automatically feed the tape cassettes, accommodated in tape cassette storage racks, with robot equipment.

Recently, the VTR automatic tape feeding apparatus as referred to above, and capable of accommodating a large number of tape cassettes therein, has come to be widely utilized in the automatic broadcasting of news, commercials or regular programs by a broadcasting station, and also, as automatic video image servicing machine in a cultural center, museum, library or the like.

Conventional VTR automatic tape feeding apparatuses of the above-described type are disclosed, for example, in U.S. Pat. Nos. 3,839,197 and 3,938,190, and various methods for storing tape cassettes have also been proposed.

Referring to FIGS. 1 to 3, one example of a conventional tape cassette storage racks will be described hereinbelow.

In FIG. 1, the known tape cassette storage rack includes a rack main body 10 having an elongated opening 11 at its front portion for allowing a tape cassette (FIGS. 2 and 3) to be mounted or dismounted therethrough, side walls 12 extending upwardly from opposite sides of the rack main body 10, with a distance therebetween corresponding to a width of a tape cassette of a standard size (a standardsized tape cassette 1a in FIG. 2, which will be referred to as a standard tape cassette), a bottom plate 13 formed with a protrusion 14 having, for example, a rectangular cross section to be fitted into a groove of a similar cross section provided at the bottom of the tape cassette, and a rear wall 15.

The bottom plate 13, side walls 12 and rear wall 15 of the rack main body 10 are integrally formed of a resin material so as to define a space for accommodating the tape cassette therein. Moreover, on the side walls 12, there are fixedly attached plate springs 16 each projecting into the tape cassette accommodating space referred to above by 2 to 3 mm and having a shape engageable with recesses, or grooves 2 (FIGS. 2 and 3) of a V-shaped or U-shaped cross section formed in corresponding side walls of the tape cassette.

In FIG. 2, showing the state where the standard tape cassette 1a is inserted in the storage rack, said tape cassette 1a is guided by the protrusion 14 formed on the bottom plate 13 of the rack main body 10, and also by the side walls 12 of said main body, while its back and forth movement (i.e. movement in a direction to insert or withdraw the tape cassette) is restricted by the plate springs 16 on the opposite side walls 12 which engage the grooves 2 formed on the side faces of said tape cassette 1a.

FIG. 3 shows the state where a small tape cassette 1b is inserted in the storage rack of FIG. 1. The bottom of the small tape cassette 1b defines a groove having a rectangular cross section (not particularly shown) for receiving the protrusion 14 on the bottom plate 13 of the storage rack. The groove is located at the same distance from one side wall of the cassette as in the standard tape cassette 1a. Thus, the small tape cassette 1b is guided by the protrusion 14 and one side wall 12 of the storage rack, with the plate spring 16 at one side of the rack being engaged with the groove 2 formed on the side face of the cassette 1b for restricting the back and forth movement of said tape cassette 1b in a manner similar to that in the tape cassette 1a.

FIG. 4 shows the state where a large number of storage rack main bodies 10 as described above are piled up in many stages, whereby movement of the tape cassettes 1a in an upward direction is restricted. In the above arrangement, the tape cassettes 1a, the plate springs 16 of the storage rack are to be pushed open, while when inserting the tape cassette 1a, the tape cassette 1a pushes open the plate springs 16, with said plate springs 16 ultimately engaged with the grooves 2 of the tape cassette 1a as described earlier.

The withdrawal and insertion of the small tape cassette 1b can be effected in a similar manner by utilizing the protrusion 14 and the plate spring 16 at one side wall 12, and thus, the storage rack is capable of positioning two kinds of tape cassettes of different sizes at the predetermined position.

However, the known arrangement as described so far has the following disadvantages.

Namely, in cases where the tape cassettes are to be manually (i.e. by human hand exchanged with those outside the VTR automatic tape feeding apparatus due to the expiration of the tape life or to merely effect a desired alteration of the contents of the tape to be supplied, or in cases where they are to be manually replaced due to urgent requirements in a broadcasting station, when such tape cassettes are taken out from the state in which they are accommodated in the piled up storage racks, it is required to provide gaps for inserting fingers between the described tape cassette to be taken out and the tape cassettes accommodated in positions above and below said desired tape cassette, thus necessitating a reduction in area efficiency. Meanwhile, it becomes very inconvenient if it is intended to deal with the problem through the reduction of the gaps or by employing a tape withdrawal jig or the like.

SUMMARY OF THE INVENTION

Accordingly, an essential object of the present invention is to provide a tape cassette storage rack which can accommodate tape cassettes of different sizes at a predetermined position, and in which the accommodated tape cassette may be directly withdrawn manually without using a jig or the like, while a high area efficiency is available with respect to the space required for the storing of tape cassettes.

Another object of the present invention is to provide a tape cassette storage rack of the above-described type which has a simple structure and functions reliably, and which can be readily manufactured at low cost.

In accomplishing these and other objects, according to one preferred embodiment of the present invention, there is provided a tape cassette storage rack which includes a rack main body having side walls and a bottom plate for guiding at least one side face and a bottom face of a tape cassette provided with a first groove means including grooves of a V-shaped or U-shaped cross section at its side faces and a second groove means extending in a linear direction, and an open portion for allowing the tape cassette to be inserted into or withdrawn from said storage rack therethrough, a protrusion provided on the bottom plate of the rack main body for receiving the second groove means formed on the bottom face of the tape cassette, an engaging means provided on at least one of said side walls of said rack main body for retractably engaging said first groove means formed on the side faces of the tape cassette, a space provided at the rear portion of said storage rack in which the tape cassette is accommodated for permitting the tape cassette to be slid back and forth, and a pusher unit disposed in said space for contacting the rear end of the tape cassette.

In the arrangement according to the present invention as described above, by providing the first groove means at the predetermined positions on the side faces of the tape cassette, and the second groove means at the predetermined position on the bottom face thereof, the movement of the tape cassette is restricted in the lateral direction as it is guided by the protrusion on the bottom plate of the rack main body which engages the tape cassette in the second groove means thereof and also, by the side walls of said rack main body. Moreover, since the engaging means of the storage rack is fitted into the first groove means at the side faces of the tape cassette, the movement of said tape cassette is also restricted in the forward and backward directions.

Meanwhile, when a desired tape cassette is to be taken out manually (by hand without using any jig or the like) from a stack of storage racks, the tape cassettes stored in the storage racks above and below the desired cassette are slid backward by depressing the cassettes with one's fingers to form spaces for allowing insertion of the fingers to grasp, the desired tape cassette and withdraw the desired tape cassette forwardly.

As the desired tape cassette is withdrawn, the tape cassettes located above and below said desired tape cassette and pushed backward by the fingers are each released, and are automatically pushed forward by the pusher units until the first groove means thereof at their side faces engage the engaging means of the storage racks, and thus, the movement of the tape cassettes are again restricted in the forward and backward directions.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
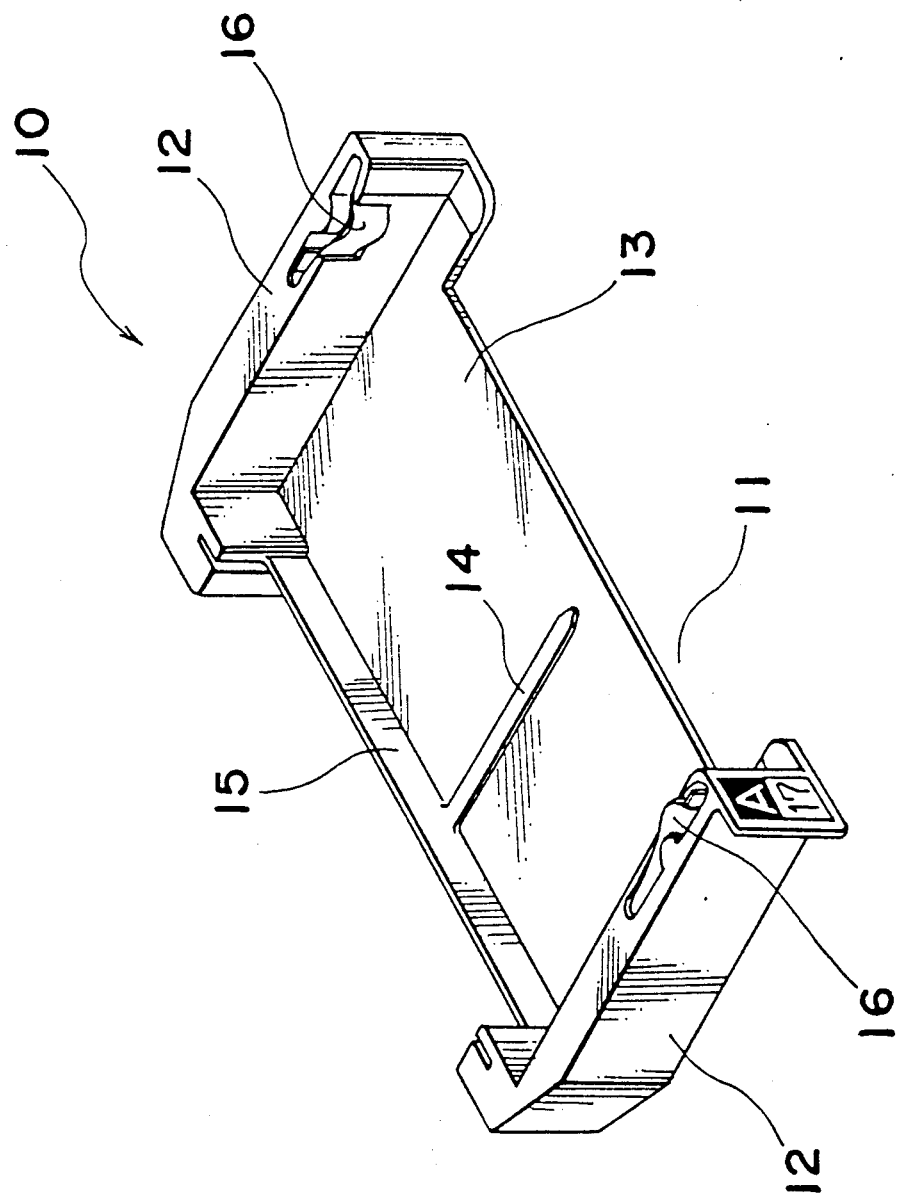
FIG. 1 is a perspective view of a conventional tape cassette storage rack (already referred to)
Figure 2:
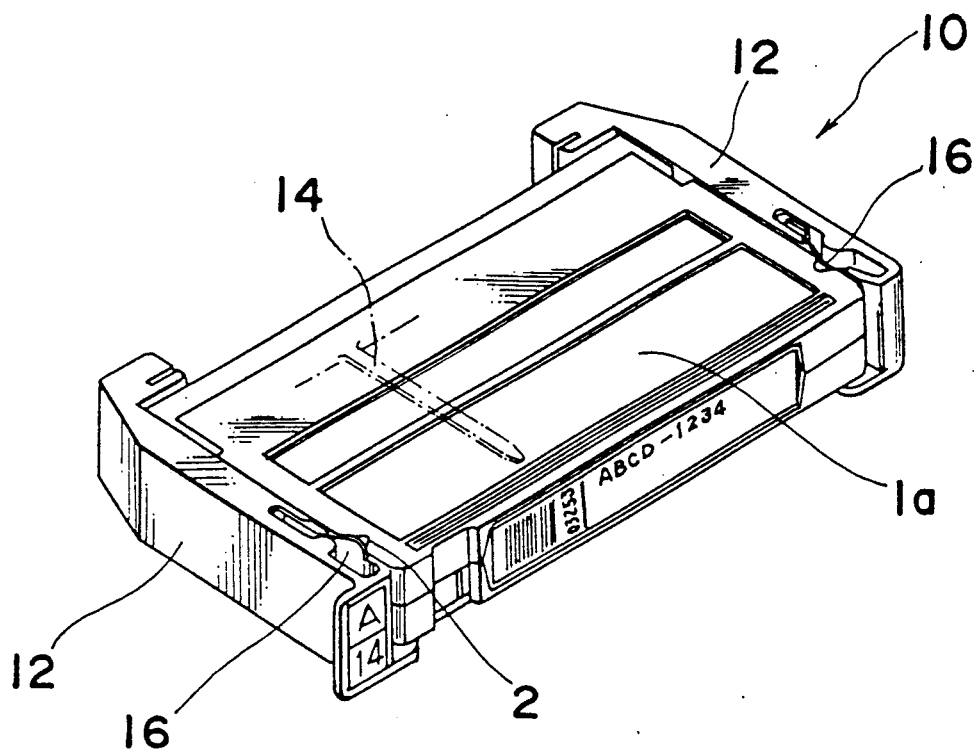
FIG. 2 is a perspective view showing the state in which a standard tape cassette is accommodated in the conventional tape cassette storage rack of FIG. 1 (already referred to)
Figure 3:
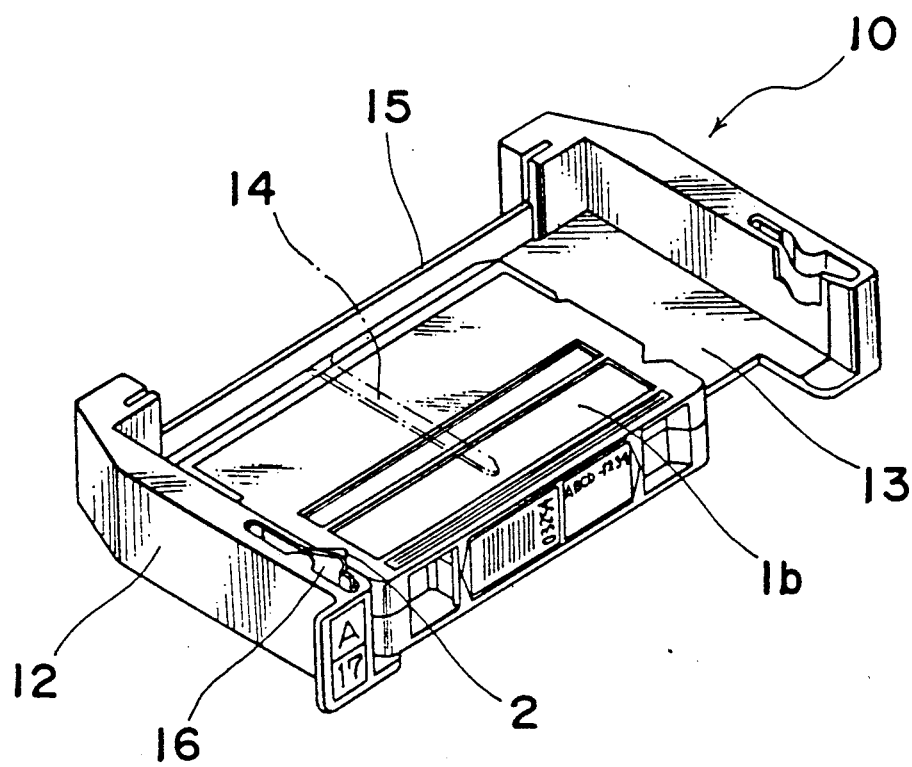
FIG. 3 is also a perspective view showing the state in which small tape cassette is accommodated in the conventional tape cassette storage rack of FIG. 1 (already referred to)

Before the description of the present invention proceeds, it is to be noted that like parts are designated by like reference numerals throughout the accompanying drawings.

Figure 5A:
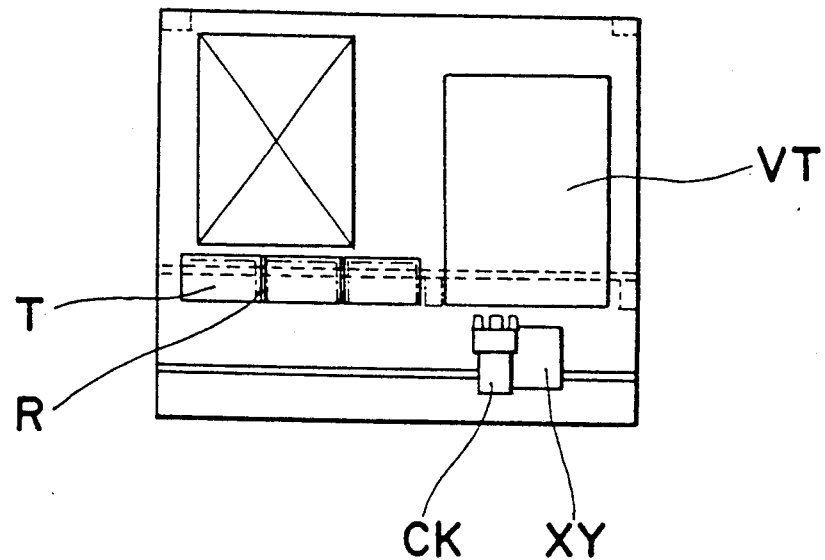
FIG. 5($a$) is a schematic top plan view of a VTR automatic tape feeding apparatus to which tape cassette storage racks according to the present invention may be applied, FIG. 5($b$) is a front elevational view of the VTR automatic tape feeding apparatus of FIG. 5($a$)
Figure 5B:
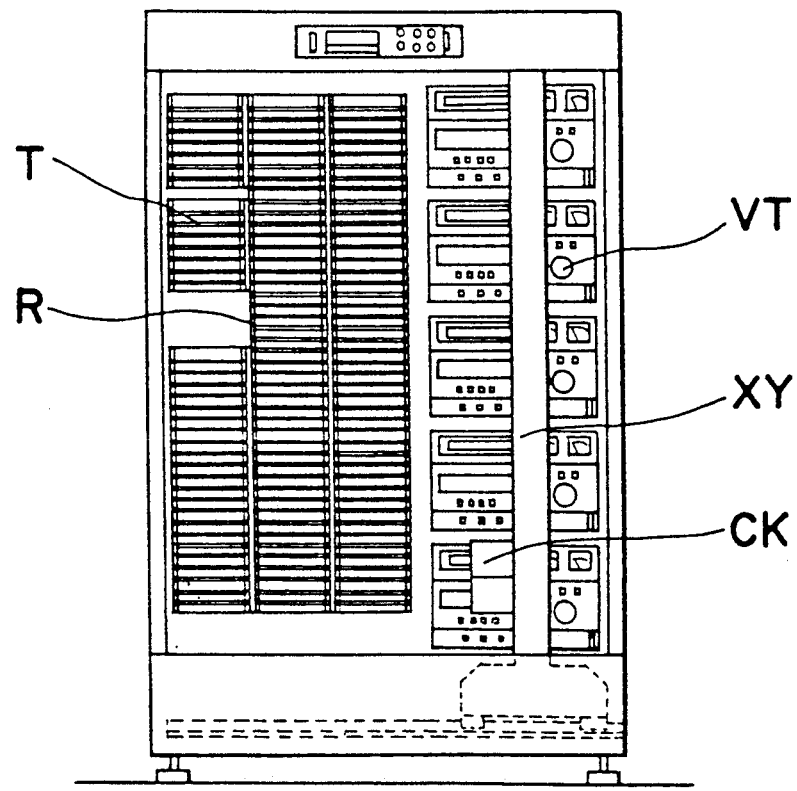

Referring now to the drawings, there is shown in FIGS. 5($a$) and 5($b$), the general structure of a VTR automatic tape feeding apparatus to which a tape cassette storage rack according to the present invention may be applied.

In FIGS. 5($a$) and 5($b$), the VTR automatic tape feeding apparatus is arranged to grasp a desired one of the tape cassettes T, accommodated in tape cassette storage rack R, with a chuck CK. The desired tape cassette is fed to a video tape recorder VT by an X-Y robot XY which moves the chuck CK as desired. Thus, by supplying to and storing the desired tape cassette in the predetermined video tape recorder VT, based on an instruction preliminarily programmed or requested, the tape in the particular tape cassette T is reproduced for automatic broadcasting.

Figure 6A:
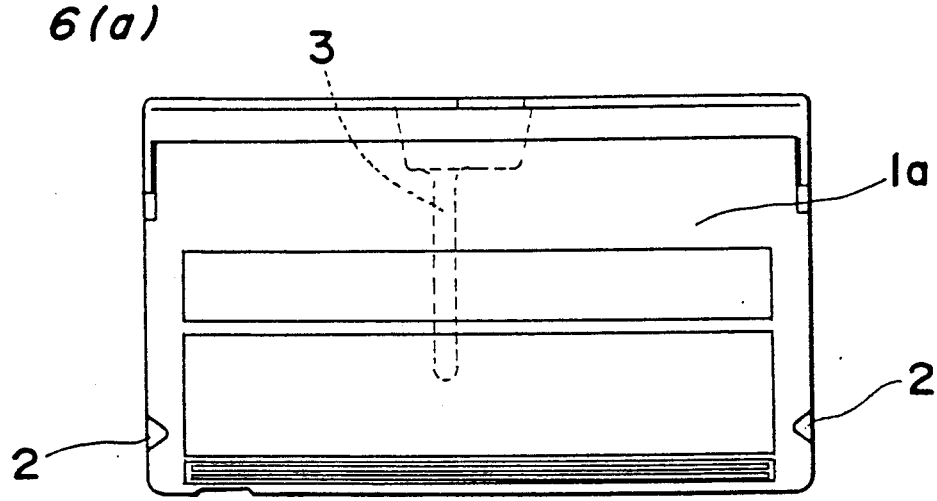
FIGS. 6($a$) and 6($b$) are a top plan view and a front elevational view, respectively, of a standard tape cassette to be accommodated in the tape cassette storage rack of the present invention.
Figure 6B:
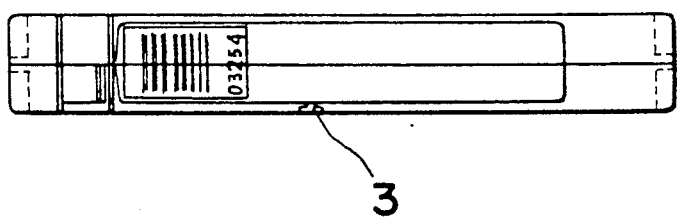
Figure 7A:
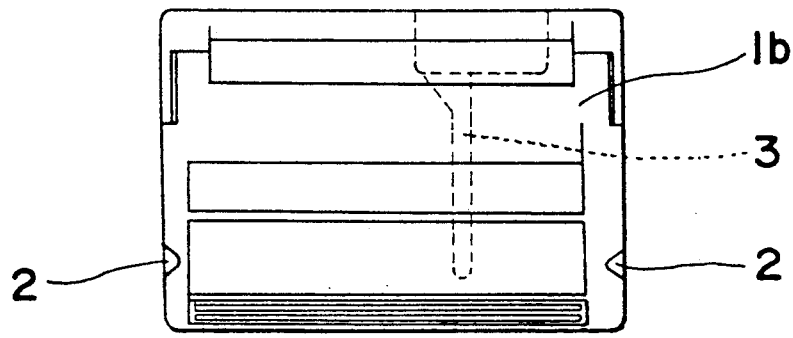
FIGS. 7($a$) and 7($b$) are views similar to FIGS. 6($a$) and 6($b$), which particularly show a small tape cassette to be accommodated in the storage rack of the present invention.
Figure 7B:
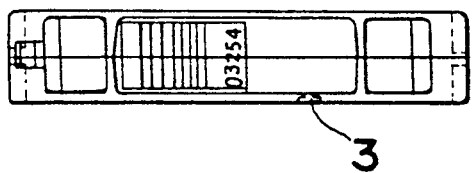

In FIGS. 6 and 7, there are shown a standard tape cassette 1$a$ and a small-sized tape cassette 1$b$ which may be applied to the tape cassette storage rack according to the present invention.

As shown in FIGS. 6($a$) and 6($b$), the standard tape cassette 1$a$ has recesses or grooves 2, for example, of a V-shaped or U-shaped cross section, defined in the opposite side faces thereof, and another straight groove 3, for example, of a rectangular cross section, defined in the bottom face thereof. In FIGS. 7($a$) and 7($b$), the small-sized tape cassette 1$b$ also has grooves 2, for example, of a V-shaped or U-shaped cross section, defined in the opposite side faces thereof, and another straight groove 3, for example, of a rectangular cross section, defined in its bottom face in a manner similar to that in the standard tape cassette 1$a$ of FIGS. 6($a$) and 6($b$). In the small-sized tape cassette 1$b$, the groove 3 is provided in a position at the same distance from the left end face of the tape cassette as in the tape cassette 1$a$, while the grooves 2 are also formed at the same distance from the front face as in the tape cassette 1a.

Figure 8:
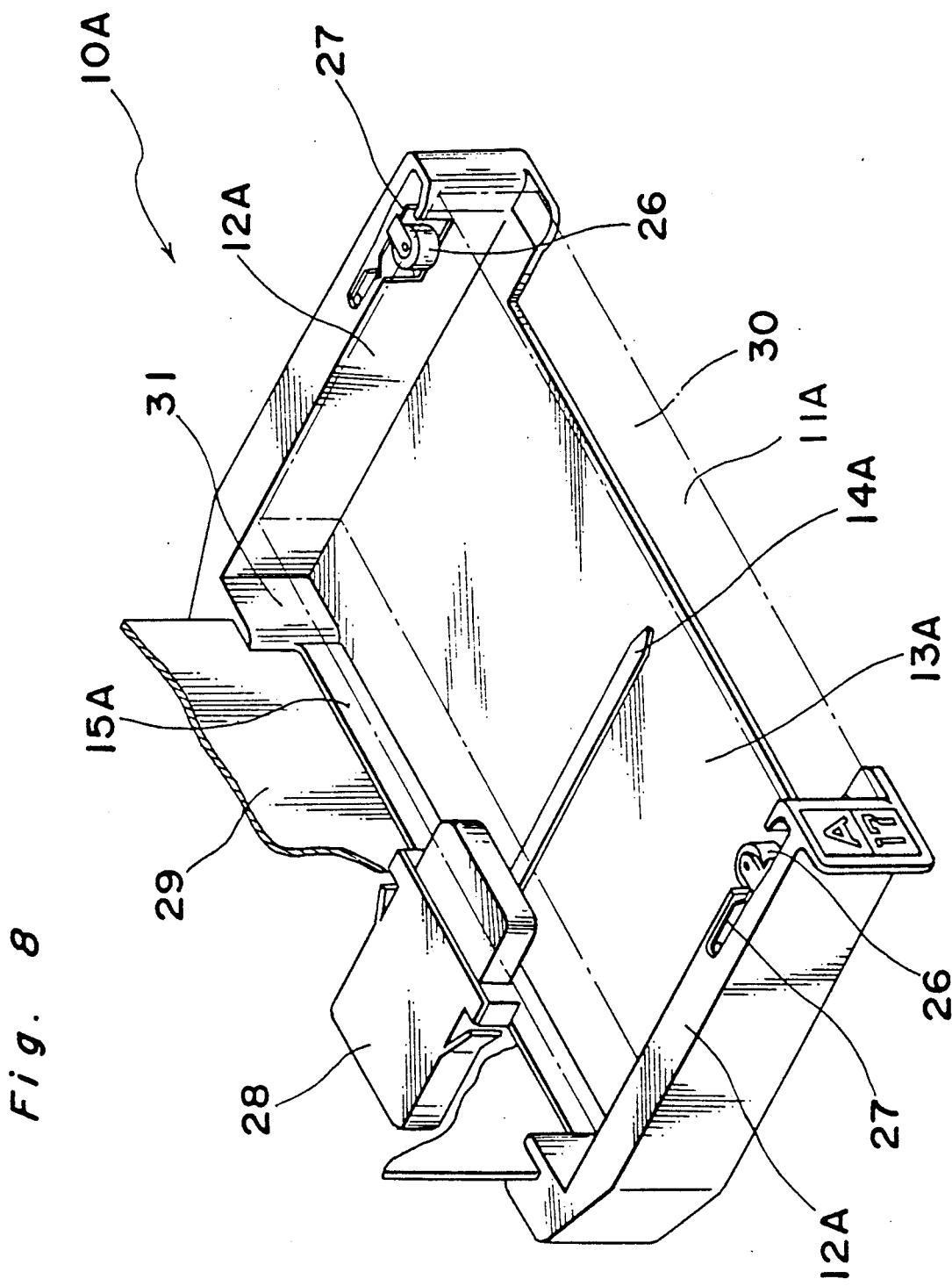
FIG. 8 is a perspective view of a tape cassette storage rack according to one preferred embodiment of the present invention.

Referring further to FIG. 8, there is shown a tape cassette storage rack according to one preferred embodiment of the present invention, which includes a rack main body 10A having side walls 12A, a bottom plate 13A formed with a protrusion 14A, and a rear wall 15A, all of which are generally similar to those features in the conventional arrangement shown in FIG. 1. The storage rack of FIG. 8 further includes rollers 26 supported by plate springs 27 and provided on the side walls 12A, a pusher unit 28 provided in a space at the rear portion of the storage rack, and a guide plate 29, with a space 30 as indicated by one-dotted chain lines being provided within said storage rack for accommodating the tape cassette therein.

The side walls 12A, bottom plate 13A and rear wall 15A of the rack main body 10A are integrally molded of a resin material so as to define openings at the front upper portions of the storage rack, the space 30 for accommodating a standard tape cassette therein, and with another space 31 for allowing the tape cassette to slide back and forth, which space 31 is provided at the rear portion of said storage rack as illustrated.

On the bottom plate 13A is provided the protrusion 14A which engages a straight groove, for example, of a rectangular cross section formed in the bottom face of the tape cassette. On the side walls 12A, there are disposed the rollers 26 supported by the plate springs 27, with part of each of the rollers 26 projecting into the rack main body 10A by 2 to 3 mm. The pusher unit 28 provided on the guide plate 29 at the rear of the storage rack is arranged to push the rear side face of the tape cassette when inserted.

Figure 9A:
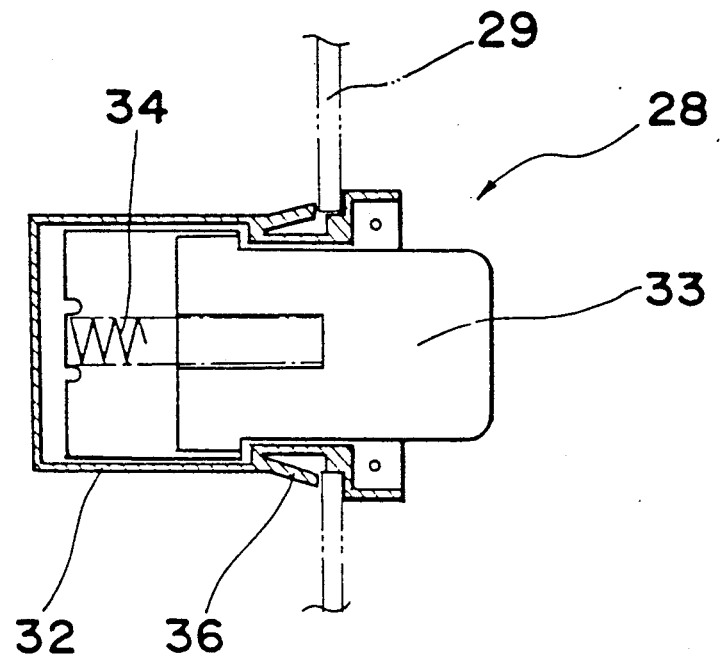
FIGS. 9($a$) and 9($b$) are a top plan view and a side elevational view, respectively, partly in section, of a pusher unit employed in the tape cassette storage rack of FIG. 8.
Figure 9B:
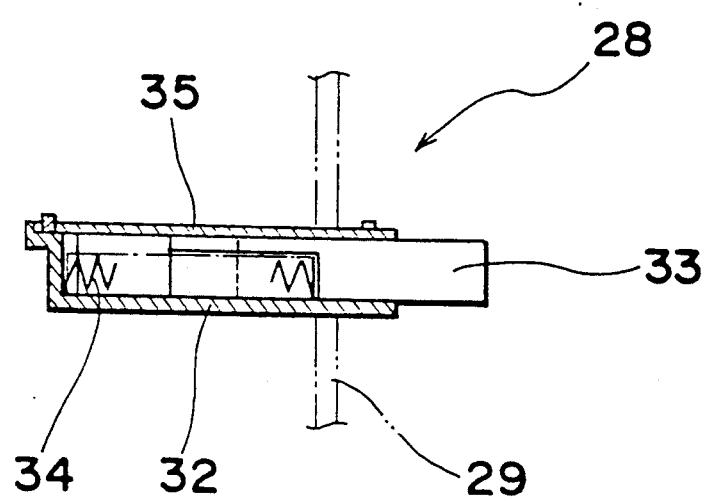

Reference is also made to FIGS. 9(a) and 9(b) showing the detailed structure of the pusher unit 28 referred to above. The pusher unit 28 detachably mounted on the guide plate 29, which serves as a guide member when a large number of the rack main bodies 10A are to be piled up in multi-stages, includes a case 32 having engaging pieces 36 for releasably attaching the case 32 to the guide plate 29, a stopper 33 retractably provided within the case 32 and normally urged outwardly towards the tape cassette by a compression coil spring 34, and a lid 35 for covering an upper opening of the case 32. The stopper 33 is guided by the case 32 and the lid 35 for sliding movement in the forward and backward directions and urged is outwardly by the coil spring 34 as described above the amount that stopper 33 projects from case 22 is restricted by stepped portion formed in the case 32 and contacting the stopper 33.

The function of the tape cassette storage rack of the present invention having the structure as described so far will be described hereinbelow.

Figure 10:
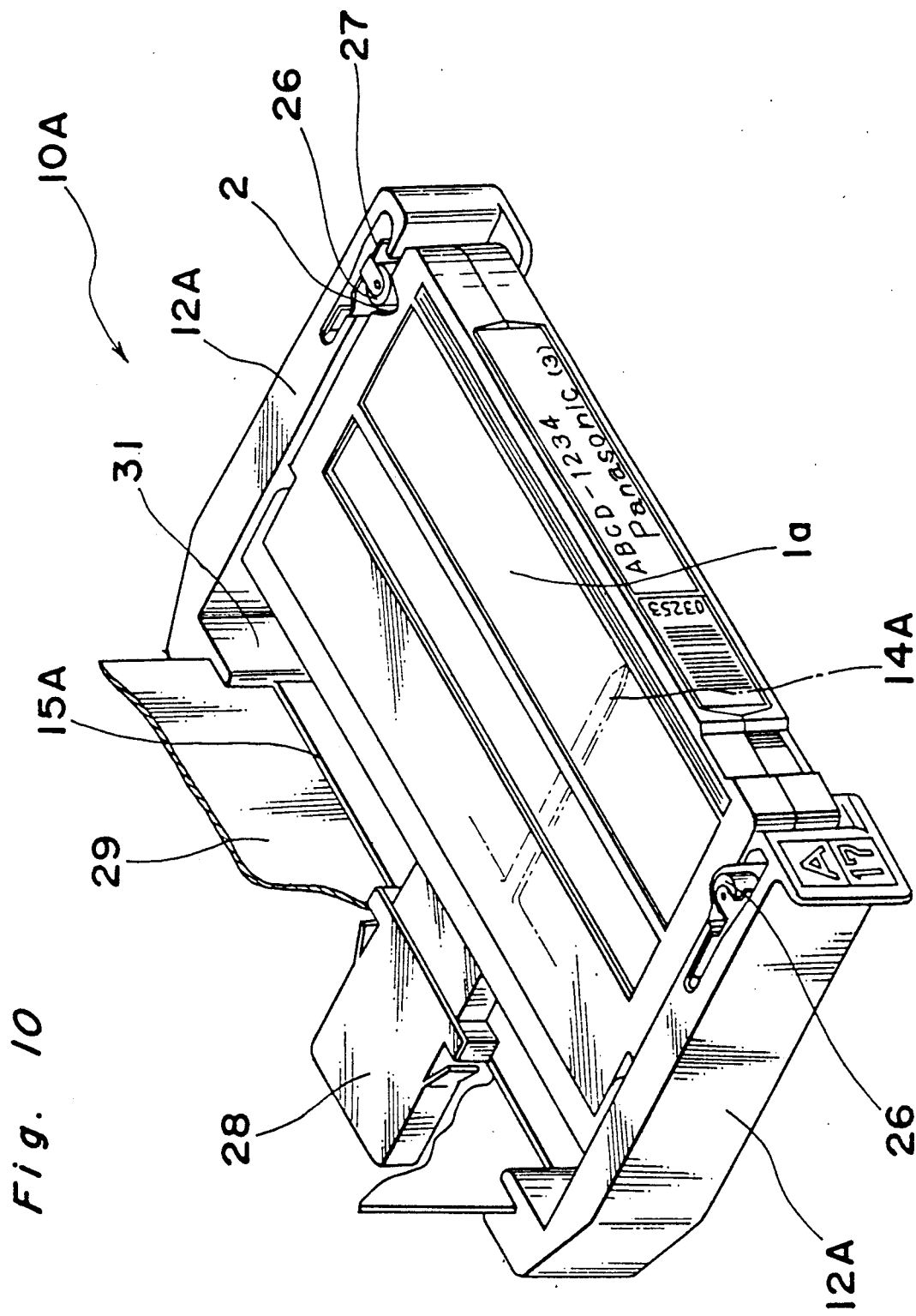
FIG. 10 is a perspective view showing the state in which the standard tape cassette of FIG. 6 is accommodated in the tape cassette storage rack of FIG. 8.
Figure 11:
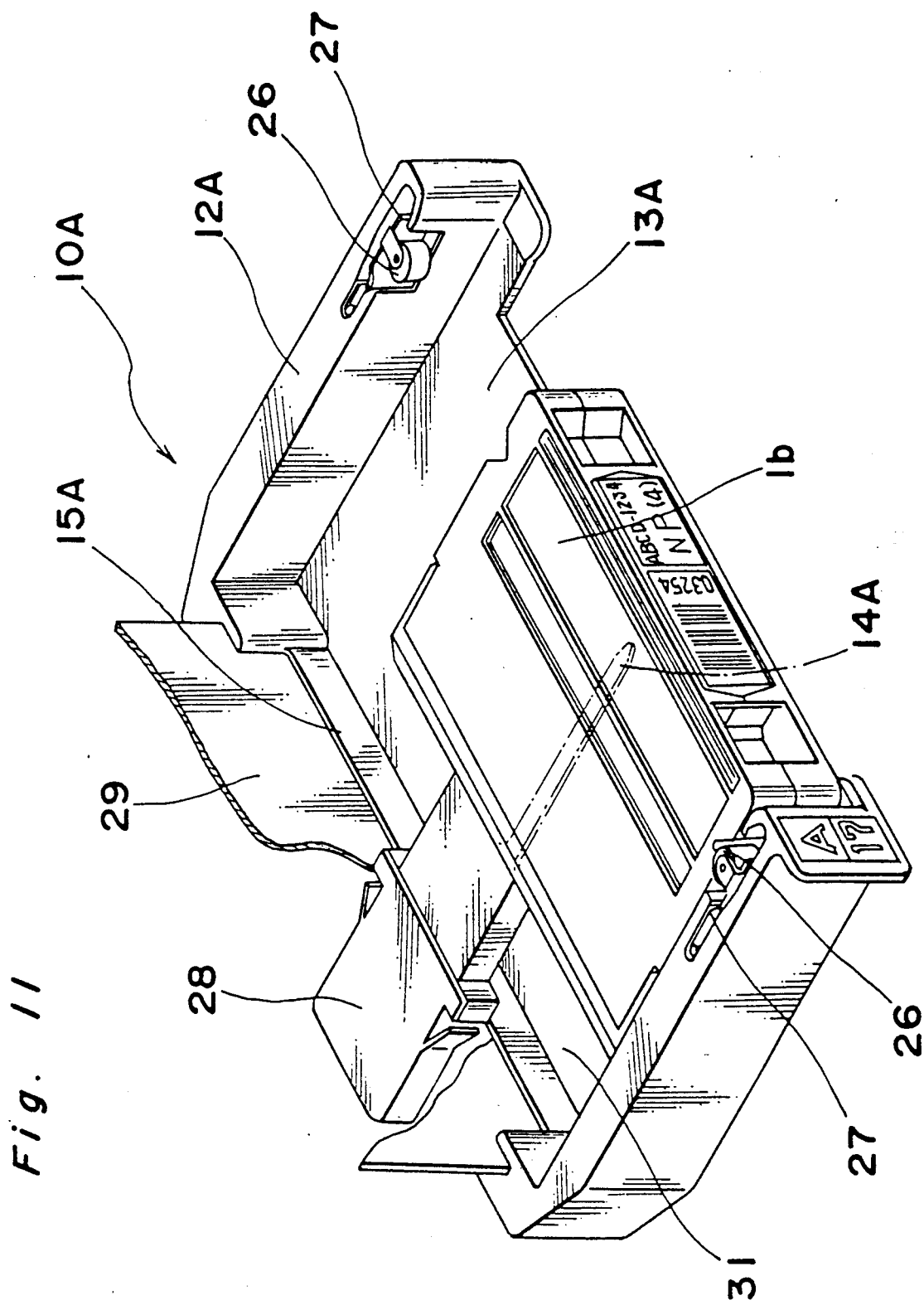
FIG. 11 is a perspective view showing the state in which the small tape cassette of FIG. 7 is accommodated in the tape cassette storage rack of FIG. 8.
Figure 12:
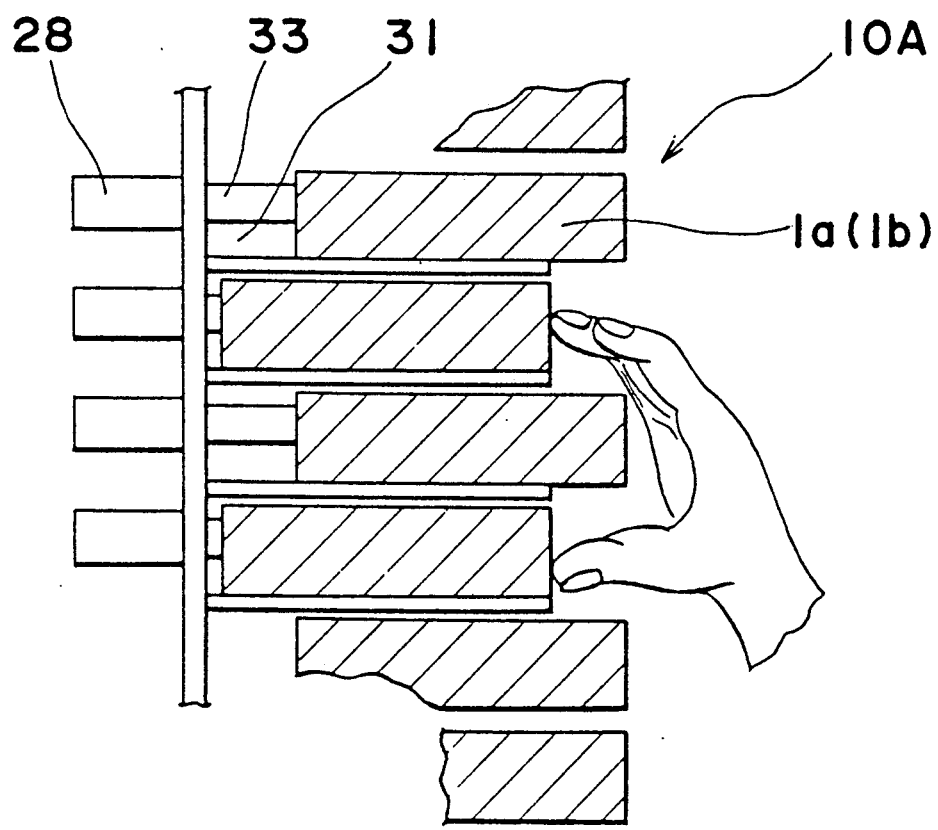
FIG. 12 is a schematic diagram showing the state in which the tape cassette is directly manually withdrawn.

FIG. 10 shows the state in which a standard tape cassette 1a is accommodated in the tape cassette storage rack of FIG. 8. The tape cassette is in guided by the protrusion 14A formed on the bottom plate 13A, and the side walls 12A of the rack main body 10A, while the movement of said tape cassette in the backward and forward directions is restricted by the rollers 26 mounted on the side walls 12A through the plate springs 27 and engaged with the grooves 2A formed on the opposite side facees of the tape cassette 1a. Similarly, FIG. 11 shows the state in which a small tape cassette 1b is accommodated in the tape cassette storage rack of FIG. 8. The tape cassette 1b is also guided by the protrusion 14A formed on the bottom plate 13A, and one of the side walls 12A of the rack main body 10A. Thus, the movement of said tape cassette 1b in the backward and forward directions is restricted by the roller 26 provided on one side wall 12A.

Figure 4:
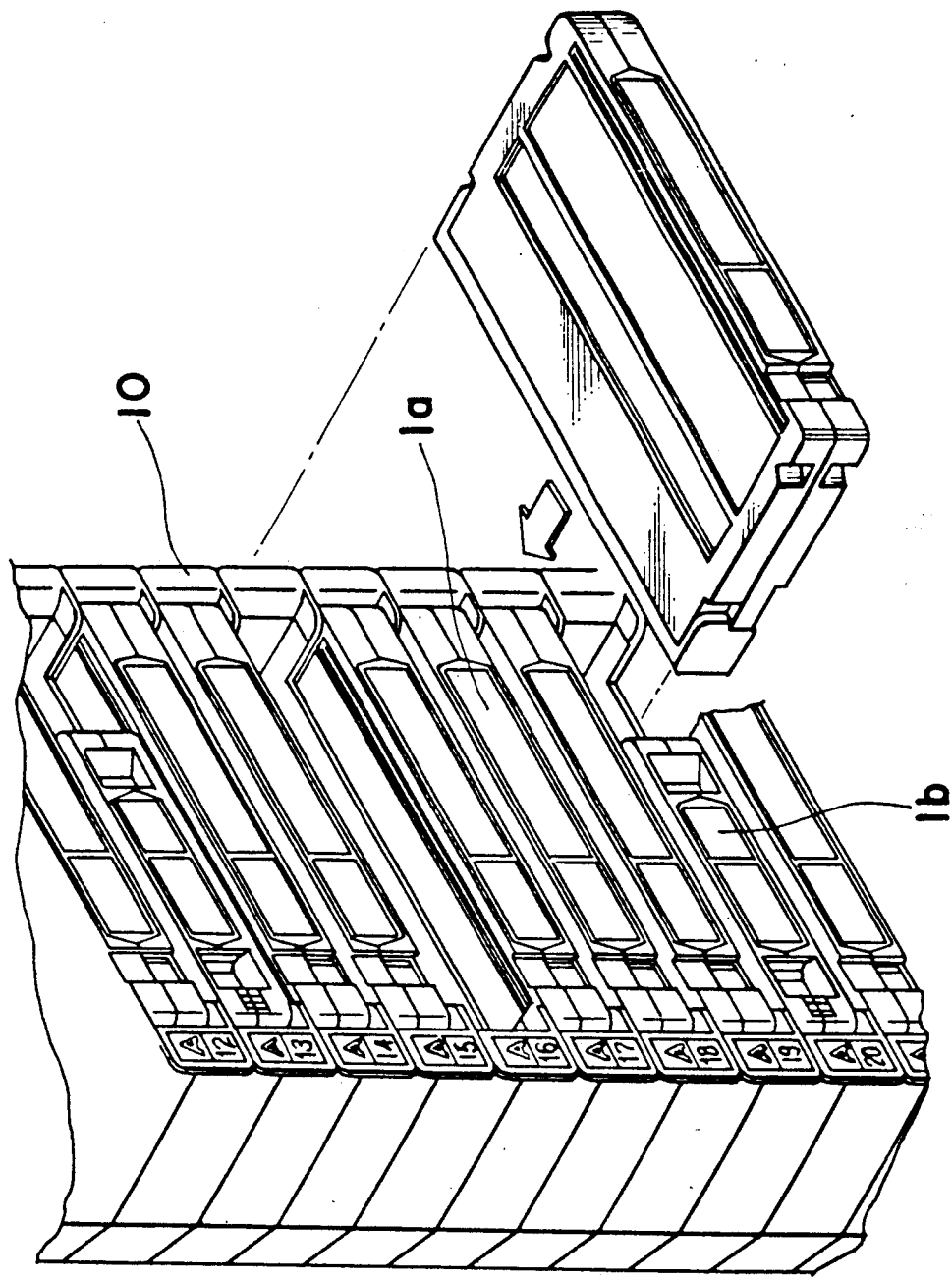
FIG. 4 is a perspective view showing the state in which the tape cassette storage racks are piled up in many stages.

In actual use, many tape cassette storage racks as described so far are piled u in multi-stages as shown in FIG. 4. Since the tape cassette storage rack according to the present invention has an upper portion open, it becomes possible to restrict the movement of the tape cassettes 1a or 1b in the upward direction when many tape cassettes are piled up as described above. Each of the tape cassettes 1a or 1b can be drawn out from or inserted into the rack main body 10A through the front of the storage rack. When manually removing the desired cassette (without using any jig or the like), the tape cassettes located above and below the desired tape cassette are pushed rearwardly with one's fingers, to thereby push back the stoppers 33 of the pusher units 28 against the urging force of the coil springs 34 for consequently sliding the tape cassettes backward. As a result, the desired tape cassette projects forwardly as compared with the tape cassettes located above and below it, and thus the desired tape cassette can be grasped by the fingers inserted thereabove and therebelow and can be readily drawn out forwardly. Upon the completion of the withdrawal of the desired tape cassette, the tape cassettes located above and below said desired tape cassette are released from being depressed by one's fingers, and are consequently pushed forwardly by the spring force of the compression coil springs 34 of the respective pusher units 28. The movement of the tape cassettes in the forward and backward directions is restricted by the engagement of the rollers 26 with the V-shaped grooves 2 of the tape cassettes (1a or 1b).

During the withdrawal of the tape cassette, such tape cassette is slid as the plate springs 27 supporting the rollers 26 are pushed open, and in this case, it is possible to smoothly slide the tape cassette due to the rotation of the rollers 26.

It should be noted here that, in the foregoing embodiment, although the plate springs 27 and the rollers 26 are disposed on the opposite side walls of the storage rack, a plate spring 27 and roller 26 may be provided only at one side wall thereof. And, although the rack main body has been described as integrally molded in the foregoing embodiment, the rack main body may comprise a combination of divided parts. Moreover, although the protrusion 14 formed on the bottom plate 13A of the rack main body 10A is described as having a rectangular cross section, the protrusion 14A may have other cross sectional shapes as long as it extends straight.

As is clear from the foregoing description, the tape cassette storage rack according to the present invention includes the rack main body having side walls and the bottom plate for guiding at least one side face and a bottom face of the tape cassette provided with the first groove means at its side faces, and the second groove means at its bottom face, an open portion for allowing the tape cassette to be inserted into or withdrawn from the storage rack therethrough, a protrusion provided on the bottom plate of the rack main body for engaging the second groove means formed on the bottom face of the tape cassette, and the engaging means (i.e. the rollers supported by the plate springs) provided on at least one of said side walls of the rack main body for retractably engaging the first groove means formed on the side faces of the tape cassette, tape cassettes of different sizes can be accommodated at the predetermined position in the same tape cassette storage rack by simple structure.

Furthermore, owing to the provision of the space at the rear portion of the storage rack in which the tape cassette is accommodated for permitting the tape cassette to be slid back and forth, and the pusher unit urged by the spring in said space for contacting with the rear end of the tape cassette, the tape cassette storage rack of the present invention is superior in area efficiency, and the tape cassettes may be directly accommodated or withdrawn manually by a simple procedure without employing any jig or the like, whereby the rack exhibits improved maintenance characteristics.

Although the present invention has been fully described by way of example with reference to the accompanying drawings, it is to be noted here that various changes and modifications will be apparent to those skilled in the art. Therefore, unless such changes and modifications otherwise depart from the scope of the present invention they should be construed as included therein.

What is claimed is:

1. The combination of a tape cassette storage rack and a tape cassette stored therein, said tape cassette having opposite sides, a rear end, a front end, and a bottom extending between said ends and said sides, and defining first grooves in said opposite sides and a second groove in said bottom thereof, said tape being accommodated in said tape cassette storage rack in a predetermined inserted position in which a clearance is established between the rear end of said tape cassette and said tape cassette storage rack, and said tape cassette storage rack having a main body including opposite side walls, a bottom plate extending between said side walls and having a protrusion extending therefrom into said second groove so as to engage said tape cassette, and an open portion at which the front end of said tape cassette is exposed and through which said tape cassette is insertable into and withdrawable from the tape cassette storage rack, retractable engaging means mounted on at least one of the side walls of said main body and engaging a respective one of said first grooves with said tape cassette in said inserted position for releasably retaining said tape cassette in said inserted position within said tape cassette storage rack, and pushing means mounted to said main body and contacting said tape cassette for exerting a biasing force on said tape cassette that acts in direction toward the open portion of said main body and which biasing force is insufficient to move said tape cassette from said inserted position and out of engagement with said engaging means, said tape cassette being slidable, with the bottom thereof being guided by said projection and at least one of the sides thereof being guided by said at least one of the side walls of said main body, further into said tape cassette storage rack from said inserted position against the biasing force exerted by said pushing means, whereby when a plurality of said tape cassette storage racks having respective said tape cassettes accommodated therein in said inserted positions are superposed and a desired one of the tape cassettes is withdrawn from its respective said tape cassette storage rack through the open portion of the main body thereof, any said tape cassette adjacent to said desired one can be slid further into the respective said tape cassette storage rack in which it is accommodated thereby allowing said desired one of the tape cassettes to be readily grasped and withdrawn whereupon said any said tape cassette will be restored to its inserted position under the biasing force exerted by the pushing means of the tape cassette storage rack in which it is accommodated.

2. The combination of a tape cassette storage rack and a tape cassette as claimed in claim 1, wherein the first grooves defined in the opposite sides of said tape cassette have a V-shaped cross section.

3. The combination of a tape cassette storage rack and a tape cassette as claimed in claim 1, wherein said protrusion extends linearly and has a rectangular cross section, and said second groove extends linearly and has a rectangular cross section complementary to that of said protrusion.

4. The combination of a tape cassette storage rack and a tape cassette as claimed in claim 1, wherein said engaging means includes a plate spring disposed on the at least one of the side walls of said main body, and a roller rotatably supported by said plate spring, part of said roller extending into a space defined in said tape cassette storage rack between the side walls of said main body.

5. The combination of a tape cassette storage rack and a tape cassette as claimed in claim 1, wherein said tape cassette storage rack includes a guide plate a rear portion of said main body, and said pushing means includes a case fixed to said guide plate, a stopper retractably mounted to said case, and a spring urging said stopper into contact with the rear end of said tape cassette.

6. A tape cassette storage system including a plurality of tape cassette storage racks superposed in multiple stages, and a plurality of tape cassettes respectively stored therein, each said tape cassette having opposite sides, a rear end, a front end, and a bottom extending between said ends and said sides, and defining first grooves in said opposite sides and a second groove in said bottom thereof, each said tape cassette accommodated in a respective said tape cassette storage rack in a predetermined inserted position which a clearance is established between the rear end of said tape cassette and said tape cassette storage rack, and each said tape cassette storage rack having a main body including opposite side walls, a bottom plate extending between said side walls and having a protrusion extending therefrom into said second groove of a respective said tape cassette so as to engage the tape cassette, and an open portion at which the front end of the respective said tape cassette is exposed and through which the tape cassette is insertable into and withdrawable from the tape cassette storage rack, retractable engaging means mounted on at least one of the side walls of said main body and engaging a respective one of said first grooves with the respective said tape cassette in said inserted position for releasably retaining the tape cassette in said inserted position within said tape cassette storage rack, and pushing means mounted to said main body and contacting the respective said tape cassette for exerting a biasing force on the tape cassette that acts in direction toward the open portion of said main body and which biasing force is insufficient to move the respective said tape cassette from said inserted position and out of engagement with said engaging means, whereby when a desired one of the tape cassettes is withdrawn from its respective said tape cassette storage rack through the open portion of the main body thereof, any said tape cassette adjacent to said desired one can be slid further into the respective said tape cassette storage rack in which it is accommodated thereby allowing said desired one of the tape cassettes to be readily grasped and withdrawn whereupon said any said tape cassette will be restored to its inserted position under the biasing force exerted by the pushing means of the tape cassette storage rack in which it is accommodated.

* * * * *